(12) United States Patent
Ozaki et al.

(10) Patent No.: US 8,973,894 B2
(45) Date of Patent: Mar. 10, 2015

(54) SOLENOID AND SOLENOID VALVE

(75) Inventors: Hiroyasu Ozaki, Wako (JP); Taneaki Miura, Wako (JP); Koichi Takaku, Wako (JP); Koichi Kato, Wako (JP); Hirokazu Kuwabara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 13/535,301

(22) Filed: Jun. 27, 2012

(65) Prior Publication Data

US 2013/0009083 A1 Jan. 10, 2013

(30) Foreign Application Priority Data

Jul. 5, 2011 (JP) .................................. 2011-149377

(51) Int. Cl.
*F16K 31/02* (2006.01)
*F16K 31/06* (2006.01)
*H01F 7/13* (2006.01)
*H01F 7/16* (2006.01)

(52) U.S. Cl.
CPC .......... *F16K 31/0655* (2013.01); *F16K 31/0675* (2013.01); *H01F 7/13* (2013.01); *H01F 7/1607* (2013.01)
USPC ......................... 251/129.15; 335/262; 335/281

(58) Field of Classification Search
USPC ................. 251/129.15; 310/14, 12.25, 12.26; 335/255, 261, 262, 281
See application file for complete search history.

(56) References Cited

U.S. PATENT DOCUMENTS

| | | | | |
|---|---|---|---|---|
| 750,132 | A * | 1/1904 | Timmis | ........................ 335/261 |
| 4,604,600 | A | 8/1986 | Clark | |
| 6,615,780 | B1 * | 9/2003 | Lin et al. | .................... 123/90.17 |
| 7,280,021 | B2 * | 10/2007 | Nagasaki | ....................... 335/255 |
| 7,746,202 | B2 * | 6/2010 | Hagen et al. | .................. 335/274 |
| 2002/0139951 | A1 * | 10/2002 | Kawamura et al. | ...... 251/129.15 |
| 2006/0000994 | A1 * | 1/2006 | Kondo | ..................... 251/129.15 |
| 2011/0048348 | A1 * | 3/2011 | Hase | .......................... 123/90.15 |

FOREIGN PATENT DOCUMENTS

| | | |
|---|---|---|
| JP | 61-287108 | 12/1986 |
| JP | 09-199322 | 7/1997 |
| JP | 2001-135520 | 5/2001 |
| JP | 4243901 | 5/2001 |
| JP | 2007-085480 | 4/2007 |
| JP | 2007-173448 | 7/2007 |

OTHER PUBLICATIONS

Japanese Office Action for corresponding JP Application No. 2011-149377, Jun. 12, 2013.

* cited by examiner

*Primary Examiner* — Matthew W Jellett
(74) *Attorney, Agent, or Firm* — Mori & Ward, LLP (57) ABSTRACT

A solenoid includes a plunger, a core, an electromagnetic coil, and a casing. A core receiving portion of the plunger is to receive a core projection while the electromagnetic coil is energized. A plunger receiving portion of the core is to receive a plunger projection while the electromagnetic coil is energized. The casing houses the plunger, the core, and the electromagnetic coil. At least one of an end portion of the plunger projection and an end portion of the core projection has an acute angle in a cross section along the axial direction. A distance between the end portion of the plunger projection and the end portion of the core projection is shortest among distances between the core and the plunger while the electromagnetic coil is not energized.

11 Claims, 10 Drawing Sheets

SOLENOID AND SOLENOID VALVE

CROSS-REFERENCE TO RELATED APPLICATIONS

The present application claims priority under 35 U.S.C. §119 to Japanese Patent Application No. 2011-149377, filed Jul. 5, 2011, entitled "Solenoid and Solenoid Valve." The contents of this application are incorporated herein by reference in their entirety.

BACKGROUND OF THE INVENTION

1. Field of the Invention

The present application relates to a solenoid and a solenoid valve.

2. Discussion of the Background

Hydrogen tanks in fuel-cell vehicles, for example, contain hydrogen at a high pressure, such as 35 to 70 MPa. Therefore, hydrogen tanks are required to have an opening portion, to which a valve device (solenoid valve) is attached, with a small opening area. To ensure sufficient flow rate from a hydrogen tank to a fuel cell, the solenoid valve is required to have a valve disc with a large stroke. In, for example, a hydrogen tank in a fuel-cell vehicle, there is a large pressure difference across the valve disc. In such a case, a large thrust (attraction force) is required in the initial stage of operation for opening the valve disc.

Various types of solenoids have been proposed which are suitable for when the valve disc is moved at a large stroke or when there is a large pressure difference across the valve disc. For example, Japanese Patent No. 4243901 describes a solenoid including a plunger (movable body) and a core (base) having surfaces inclined with respect to the axial direction in areas where a thrust is generated. Accordingly, the surface area is increased and sufficient thrust is generated even when the stroke is large. Japanese Unexamined Patent Application Publication No. 9-199322 describes a solenoid including a plunger (movable iron piece) having a projection and a core (iron core) having a recess. The projection and the recess are positioned close to each other in the initial stage of operation (before the operation), for moving a valve disc at a large stroke. Accordingly, a large thrust can be generated. Japanese Unexamined Patent Application Publication No. 2007-173448 describes a solenoid including, in addition to the basic structure including a plunger, a core, a coil, and a casing, an additional component for generating a large thrust when the stroke is large.

SUMMARY OF THE INVENTION

According to one aspect of the present invention, a solenoid includes a plunger, a core, an electromagnetic coil, and a casing. The plunger has an axial direction and is movable in the axial direction. The plunger includes a plunger projection and a core receiving portion. The core is provided to face the plunger in the axial direction and includes a core projection and a plunger receiving portion. The electromagnetic coil is configured to pull the plunger toward the core while the electromagnetic coil is energized. The core receiving portion of the plunger is to receive the core projection while the electromagnetic coil is energized. The plunger receiving portion of the core is to receive the plunger projection while the electromagnetic coil is energized. The casing houses the plunger, the core, and the electromagnetic coil. At least one of an end portion of the plunger projection and an end portion of the core projection has an acute angle in a cross section along the axial direction. A distance between the end portion of the plunger projection and the end portion of the core projection is shortest among distances between the core and the plunger while the electromagnetic coil is not energized.

According to another aspect of the present invention, a solenoid valve includes the solenoid, a valve box, a valve seat, a valve disc, and an urging member. The valve box includes a flow channel through which pressure fluid flows. The valve seat is provided on the valve box. The valve disc is contactable with and movable away from the valve seat in conjunction with a movement of the plunger in the solenoid. The urging member is to urge the valve disc in a valve opening direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Solenoids and solenoid valves including the solenoids according to embodiments will now be described with reference to FIGS. 1 to 10.

First Embodiment

Figure 1:
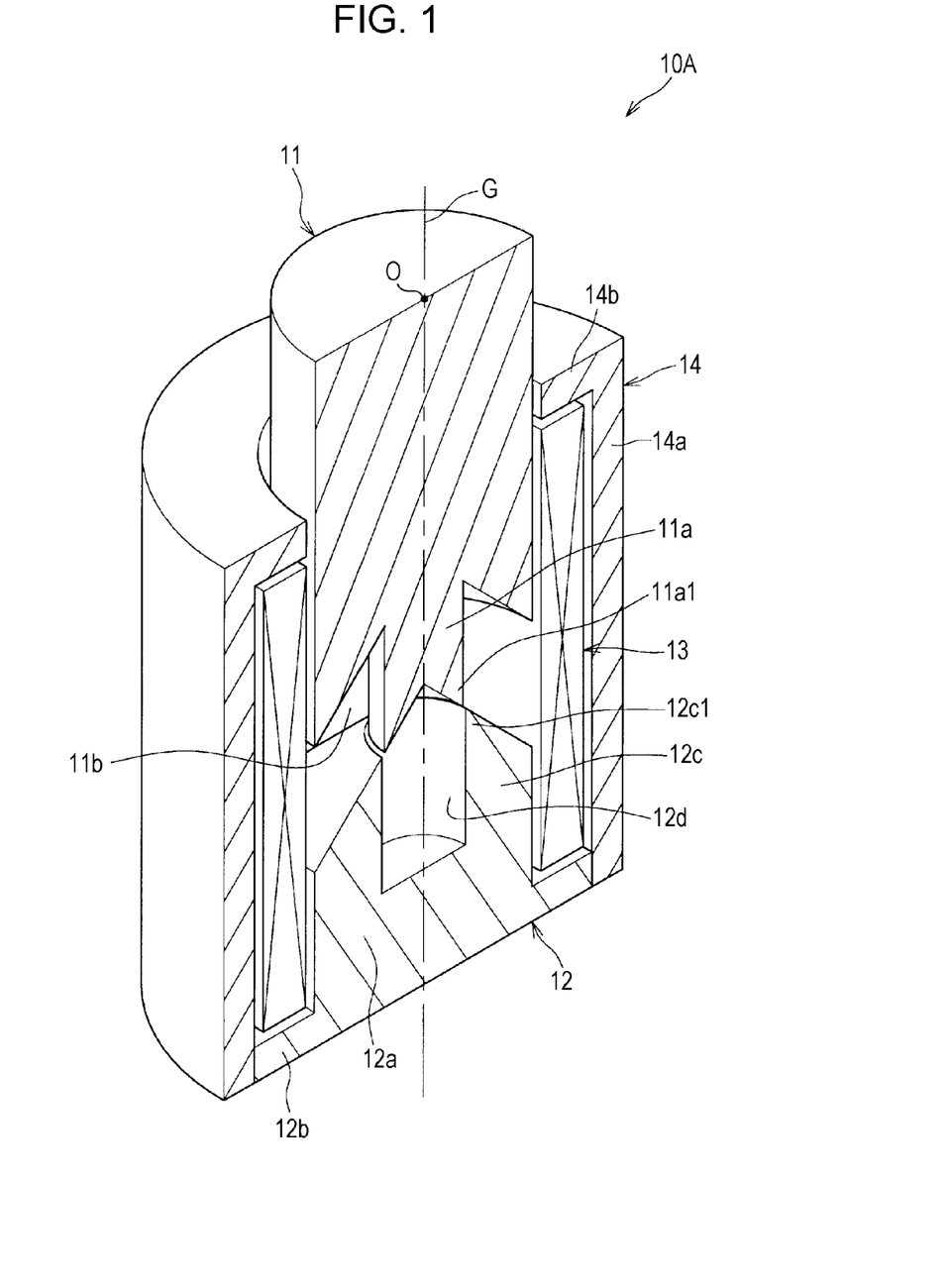
FIG. 1 is a perspective sectional view of a solenoid according to a first embodiment.

Referring to FIG. 1, a solenoid 10A includes a plunger 11 (movable core), a core 12 (fixed core), an electromagnetic coil 13, and a casing 14 that houses the plunger 11, the core 12, and the electromagnetic coil 13.

The plunger 11 is made of a magnetic metal material and has a substantially columnar shape. The plunger 11 is arranged to be movable in the axial direction G. The plunger 11 is slidably supported at the peripheral surface thereof by, for example, a cylindrical plain bearing (not shown) disposed in the casing 14.

The core 12 is made of a magnetic metal material and has a substantially projecting shape. The core 12 includes a base portion 12a that extends toward the plunger 11 and a collar portion 12b that projects radially outward from the peripheral surface of the base portion 12a. The collar portion 12b is in contact with the casing 14.

The electromagnetic coil 13 generates an electromagnetic force when energized. The electromagnetic coil 13 includes a cylindrical bobbin 13a (see FIG. 2; not illustrated in FIG. 1) made of a synthetic resin material (non-magnetic material) and a coil 13b formed by winding a copper wire around the bobbin 13a. As illustrated in FIG. 1, the base portion 12a and a portion of the plunger 11 are inserted into the inner space of the electromagnetic coil 13 from one and the other ends thereof in the axial direction G.

The casing 14 is made of a magnetic metal material and has a substantially cylindrical shape. The casing 14 includes a cylindrical portion 14a that is formed so as to surround the electromagnetic coil 13 and a collar portion 14b that extends toward the plunger 11 at the end of the cylindrical portion 14a close to the plunger 11.

In the solenoid 10A, a magnetic circuit including the plunger 11, the core 12, and the casing 14 is formed around the electromagnetic coil 13.

Figure 2:
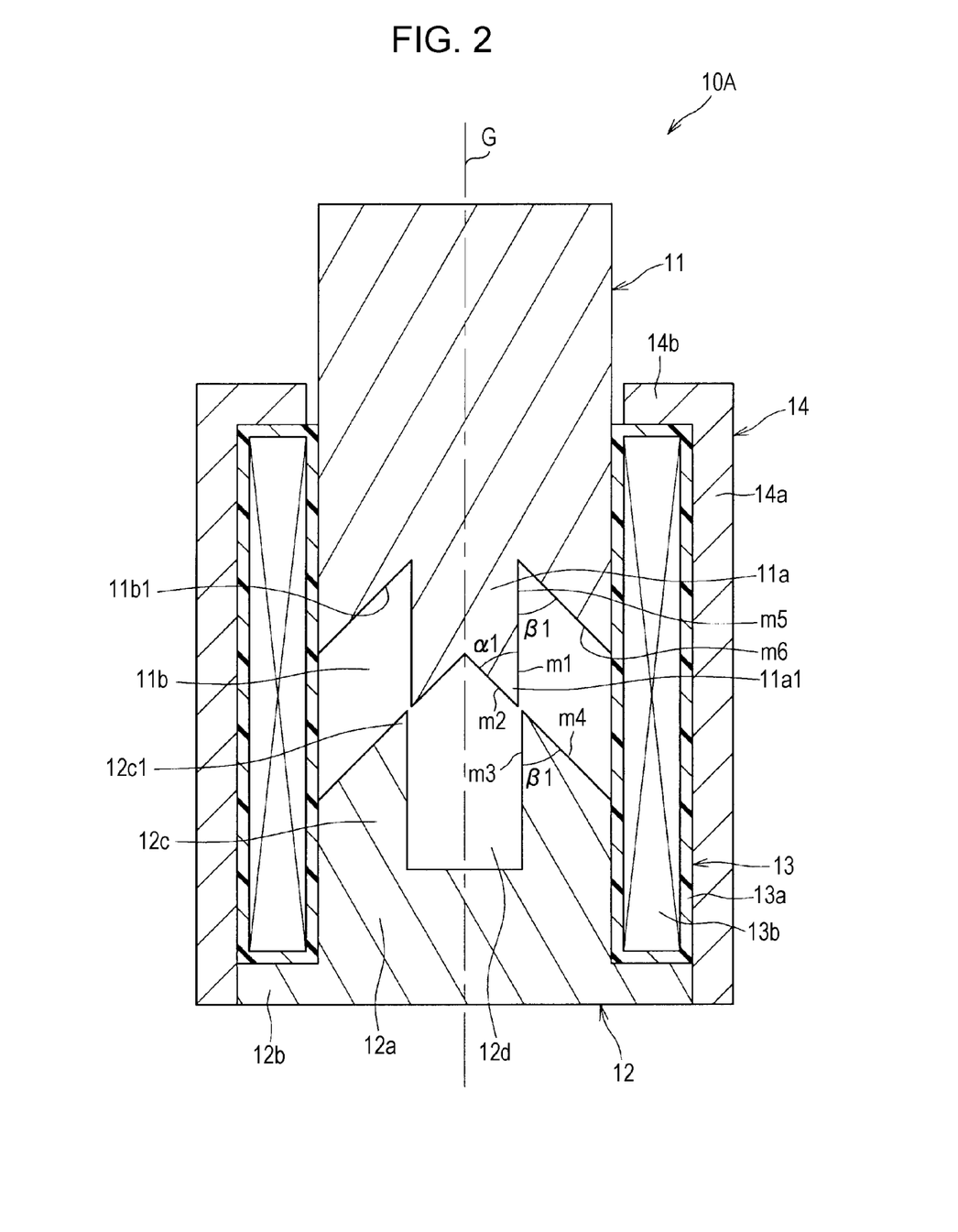
FIG. 2 is a sectional view of the solenoid according to the first embodiment.

As illustrated in FIGS. 1 and 2, a plunger projection 11a, which has a substantially columnar shape, is formed integrally with the plunger 11 so as to project toward the core 12. The plunger projection 11a has a diameter that is smaller than the diameter of the plunger 11, and the central axis of the plunger projection 11a extends through the radial center O of the plunger 11.

The plunger projection 11a includes an end portion 11a1 having an acute angle in cross section taken along the axial direction G (hereinafter referred to simply as axial cross section). In the axial cross section illustrated in FIG. 2, the end portion 11a1 of the plunger projection 11a is formed such that a surface m1 that linearly extends along the axial direction G and a surface m2 that is inclined radially inward with respect to the axial direction G form an acute angle $\alpha 1$ therebetween.

The core 12 includes a substantially annular core projection 12c that projects toward the plunger 11. The inner diameter of the core projection 12c is set so as to allow the plunger projection 11a to move back and forth without coming into tight contact with the core projection 12c.

The core projection 12c includes an end portion 12c1 having an acute angle in the axial cross section. In the axial cross section illustrated in FIG. 2, the annular end portion 12c1 of the core projection 12c is formed such that a surface m3 that linearly extends along the axial direction G and a surface m4 that is inclined radially outward with respect to the axial direction G form an acute angle $\beta 1$ therebetween.

The angles $\alpha 1$ and $\beta 1$ are not particularly limited as long as they are acute. The angles $\alpha 1$ and $\beta 1$ may either be the same or different from each other.

The plunger 11 also includes a core receiving portion 11b that is formed around the plunger projection 11a. The core receiving portion 11b receives the core projection 12c when the electromagnetic coil 13 is energized. The core receiving portion 11b is formed in a shape that corresponds to the acute shape of the core projection 12c. Referring to the axial cross section illustrated in FIG. 2, the core receiving portion 11b is formed such that a surface m5 that linearly extends along the axial direction G and a surface m6 that is inclined radially outward with respect to the axial direction G form an acute angle $\beta 1$ therebetween. This angle $\beta 1$ is equal to the angle $\beta 1$ between the surfaces m3 and m4.

The core 12 also includes a plunger receiving portion 12d that is provided inside the core projection 12c. The plunger receiving portion 12d receives the plunger projection 11a and has a recessed shape in the axial cross section.

FIGS. 1 and 2 illustrate the state in which the electromagnetic coil 13 is not energized (state before the operation). Of all parts of the plunger 11 and the core 12, the end portion 11a1 of the plunger projection 11a and the end portion 12c1 of the core projection 12c are the parts that are closest to each other. In the present embodiment, corners of the end portions 11a1 and 12c1 are substantially opposed to each other in a direction orthogonal to the axial direction G.

Figure 3:
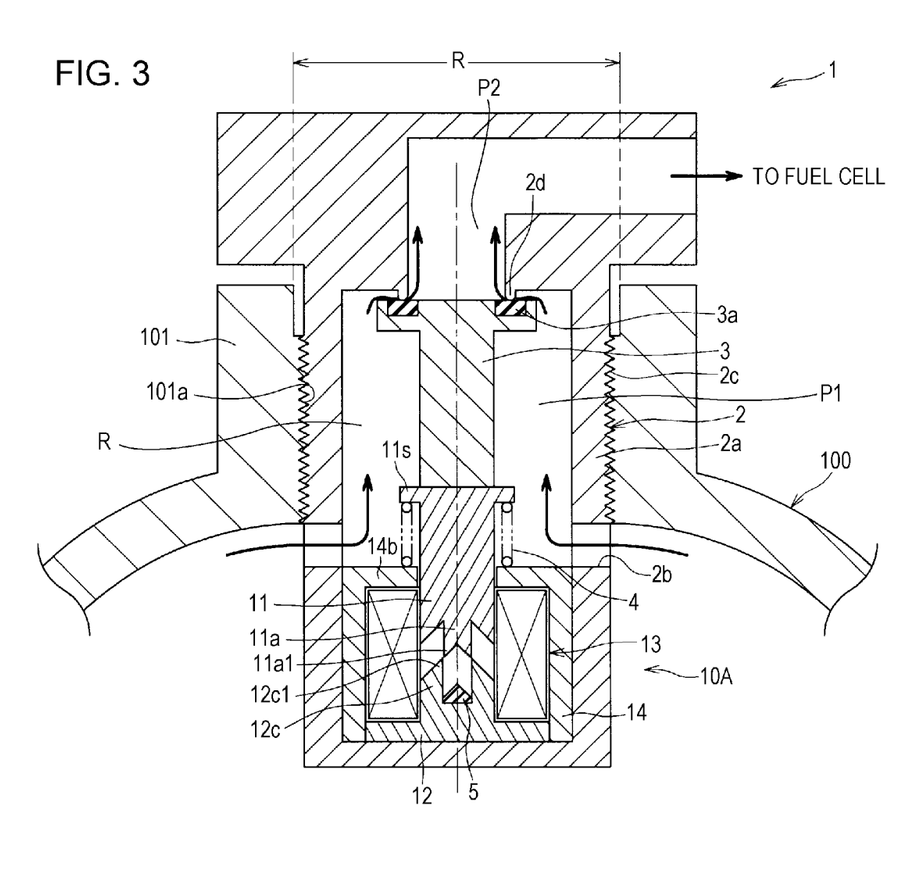
FIG. 3 is a sectional view illustrating the state in which a solenoid valve including the solenoid according to the first embodiment is attached to a tank.

FIG. 3 is a sectional view illustrating the state in which a solenoid valve 1 including the solenoid 10A according to the first embodiment is attached to a tank 100. The solenoid valve 1 is screwed into a cylindrical opening portion 101 (neck portion) provided on the tank 100. The tank 100 is mounted in, for example, a vehicle such as a fuel-cell vehicle, and contains hydrogen (pressure fluid) at an extremely high pressure. When the solenoid valve 1 is opened, the hydrogen contained in the tank 100 is supplied to an anode (not shown) of a fuel cell through, for example, a reducing valve. In addition, compressed air is supplied from an air compressor mounted in the vehicle at another location to a cathode (not shown) of the fuel cell through, for example, a humidifier. The object to which the solenoid valve 1 is attached is not limited to a tank of a fuel-cell vehicle. The pressure fluid contained in the tank is not limited to hydrogen.

The solenoid valve 1 includes a valve box 2, a valve disc 3, and a helical compression spring 4 (urging member) in addition to the solenoid 10A.

The valve box 2 includes a substantially cylindrical housing portion 2a that houses the valve disc 3, the helical compression spring 4, and the solenoid 10A. The valve box 2 has communication holes 2b that communicate with the tank 100. A flow channel R that extends from the communication holes 2b to the outside of the tank 100 is formed in the valve box 2.

Thread grooves 2c are formed in the outer peripheral surface of the valve box 2, and the solenoid valve 1 is attached to the tank 100 by engaging the thread grooves 2c with thread grooves 101a formed in the inner peripheral wall surface of the opening portion 101 of the tank 100. The tank 100 and the solenoid valve 1 are fastened together with a sealing member (not shown) interposed therebetween, so that the hydrogen in the tank 100 does not leak to the outside.

The valve disc 3 has a substantially columnar shape, and is coaxially connected to the plunger 11 in the solenoid 10A. A valve seat 2d is formed at the exit of the flow channel R in the valve box 2. The valve disc 3 is movable in conjunction with a movement of the plunger 11 so as to come into contact with and move away from (be seated on and separated from) the valve seat 2d. A sealing member 3a is fitted to a surface of the valve disc 3 that faces the valve seat 2d.

When the valve disc 3 is in contact with (seated on) the valve seat 2d, the valve disc 3 blocks the area downstream thereof (the outside of the tank 100) from the area upstream thereof (the inside of the tank 100), so that the supply of the hydrogen from the tank 100 is stopped. When the valve disc 3 is moved away from (separated from) the valve seat 2d, the hydrogen in the tank 100 is supplied through the communication holes 2b, the flow channel R, and the space between the valve seat 2d and the valve disc 3 along the arrows illustrated in FIG. 3.

One end of the helical compression spring 4 is in contact with a flange portion 11s, which is formed at a base end (upper end in FIG. 3) of the plunger 11. The other end of the helical compression spring 4 is in contact with the collar portion 14b of the casing 14 of the solenoid 10A. The helical compression spring 4 urges the plunger 11 in a direction away from the core 12, thereby urging the valve disc 3 toward the valve seat 2d.

The solenoid 10A includes a stopper 5 that restrains the plunger 11 from moving (being displaced) beyond a predetermined stroke. The stopper 5 is made of, for example, an elastic material such as rubber, and is provided on the bottom surface of the plunger receiving portion 12d of the core 12. The position of the stopper 5 is not limited to that in the present embodiment, and the stopper 5 may instead be provided on the plunger 11. Alternatively, the stopper 5 may be disposed outside the casing 14 on a moving path of the plunger 11.

Figure 4A:
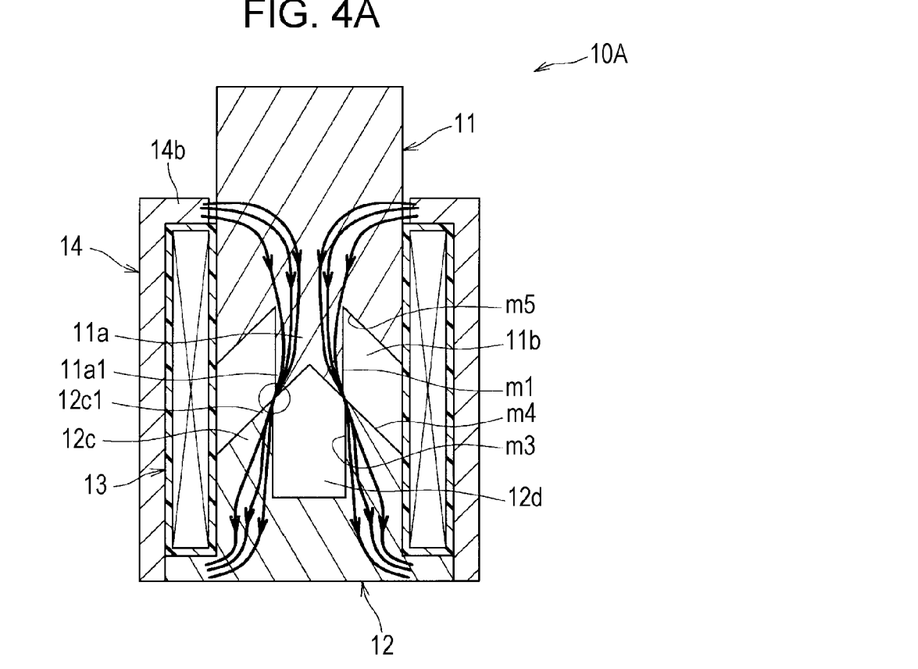
FIG. 4A illustrates the flow of magnetic flux generated in the solenoid according to the first embodiment when the solenoid valve is closed (in the initial stage of operation).
Figure 4B:
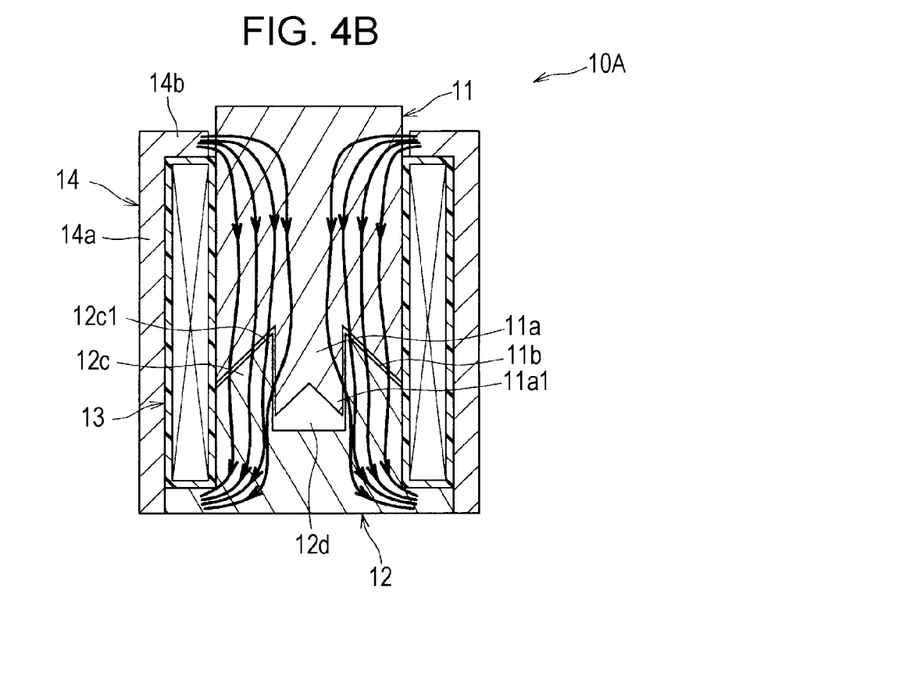
FIG. 4B illustrates the flow of magnetic flux generated in the solenoid according to the first embodiment when the solenoid valve is opened (after the operation).

The operation of the solenoid 10A according to the first embodiment will now be explained with reference to FIGS. 3 to 5. FIG. 3 illustrates the state in which the solenoid 10A is not energized and no electromagnetic force is generated by the solenoid 10A. In this state, the plunger 11 is urged by the spring force (urging force) of the helical compression spring 4 and the pressure of the hydrogen in the tank 100 in the direction so that the valve disc 3 is pressed against the valve seat 2d. In FIG. 4, the stopper 5 illustrated in FIG. 3 is not illustrated.

As illustrated in FIG. 4A, in the initial stage of operation in which the electromagnetic coil 13 is energized, the magnetic flux that passes through the casing 14 flows from the plunger 11 to the core 12, and returns to the casing 14. When the magnetic flux flows from the plunger 11 to the core 12, the end portion 11a1 of the plunger projection 11a and the end portion 12c1 of the core projection 12c are closest to each other. In addition, the end portions 11a1 and 12c1 have acute shapes in the axial cross section. Therefore, the magnetic flux flows through the end portions 11a1 and 12c1 in a concentrated manner (see the circled area in FIG. 4A). Since the magnetic flux flows in a concentrated manner while the plunger 11 and the core 12 are extremely close to each other in the initial stage of operation, the thrust for moving the plunger 11 (and the valve disc 3) can be increased.

Referring to FIG. 4B, when the plunger 11 and the core 12 become closest to each other after the operation, the plunger projection 11a is placed in the plunger receiving portion 12d and the core projection 12c is placed in the core receiving portion 11b. Accordingly, the area in which the magnetic flux flows from the plunger 11 to the core 12 reaches a maximum.

In the period between the initial stage of operation illustrated in FIG. 4A and the state after the operation illustrated in FIG. 4B, the area in which the surface m1 (see FIG. 4A), which forms the core receiving portion 11b and which is parallel to the axial direction G, and the surface m3 (see FIG. 4A), which is a surface of the core projection 12c that is parallel to the axial direction G, face each other gradually increases. As a result, the concentration of the magnetic flux gradually decreases, and the thrust that pulls the plunger 11 (attraction force applied between the plunger 11 and the core 12) gradually decreases accordingly. In the area between the surface m5 (see FIG. 4A), which is inclined with respect to the axial direction G, and the surface m4 (see FIG. 4A), which is also inclined with respect to the axial direction G, the attraction force gradually increase as the surfaces m5 and m4 approach each other. The attraction force further increases in the state after the operation. The trust that moves the plunger 11 (valve disc 3) is determined by the combination of the increase and decrease thereof. The trust applied after the operation is lower than that in the initial stage of operation.

In the state after the operation illustrated in FIG. 4B, the plunger projection 11a is in contact with the stopper 5 (see FIG. 3; not illustrated in FIGS. 4A and 4B). Thus, the plunger 11 is restrained from being displaced and the movement of the plunger 11 is stopped.

Figure 5A:
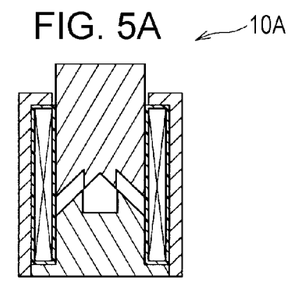
FIGS. 5A to 5E illustrate the operational effects of the solenoid according to the first embodiment.
Figure 5B:
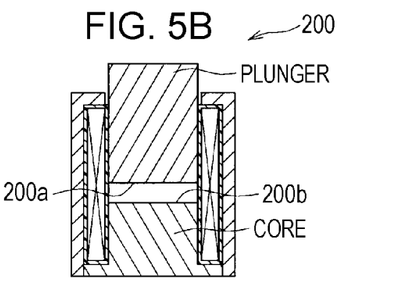
Figure 5C:
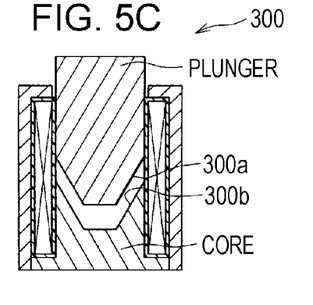
Figure 5D:
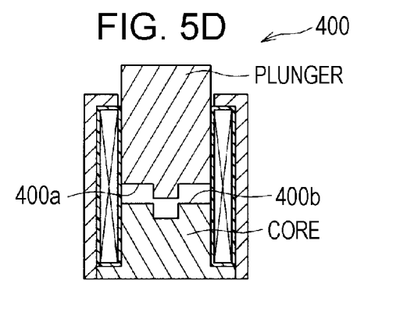
Figure 5E:
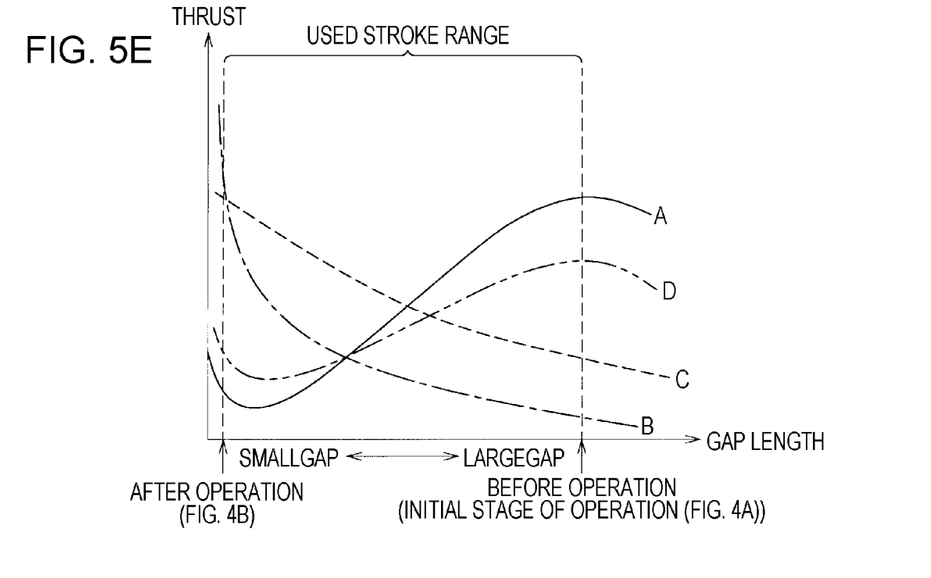

FIGS. 5A to 5E illustrate the operational effects of the solenoid 10A according to the first embodiment. FIG. 5A is a sectional view of the solenoid 10A according to the present embodiment. FIG. 5B is a sectional view of a solenoid 200 of Comparative Example 1 in which a plunger and a core respectively have flat surfaces 200a and 200b that face each other in the axial direction and that are orthogonal to the axial direction. FIG. 5C is a sectional view of a solenoid 300 of Comparative Example 2 in which a plunger and a core respectively have surfaces 300a and 300b that are inclined with respect to the axial direction. FIG. 5D is a sectional view of a solenoid 400 of Comparative Example 3 in which a plunger and a core respectively have a projection 400a and a recess 400b that receives the projection 400a. FIGS. 5A to 5D illustrate the state before the operation (initial stage of operation). FIG. 5E is a graph showing the thrust variation from the initial stage of operation (state before the operation) to the state after the operation in the solenoids illustrated in FIGS. 5A to 5D. In the graph, the gap is at a maximum, in other words, the plunger (11) and the core (12) are farthest from each other, in the initial stage of operation (state before the operation). The gap is at a minimum, in other words, the plunger (11) and the core (12) are closest to each other, in the state after the operation.

As is clear from the graph of FIG. 5E, in Comparative Example 1 (B), the thrust is at a minimum in the initial stage of operation (when the gap is at a maximum). The thrust increases as the gap decreases, and reaches a maximum after the operation (when the gap is at a minimum). The thrust is small in the initial stage of operation because the distance between the flat surfaces 200a and 200b is large, and increases as the flat surfaces 200a and 200b approach each other.

In Comparative Example 2 (C), the thrust is at a minimum in the initial stage of operation (when the gap is at a maximum). The thrust increases as the gap decreases, and reaches a maximum after the operation (when the gap is at a minimum). In Comparative Example 2, the surface area in which the plunger and the core face each other is larger than that in Comparative Example 1, and the gap relative to stroke is smaller than that in Comparative Example 1. Therefore, the thrust in the initial stage of operation is larger than that in Comparative Example 1. However, similar to Comparative Example 1 (B), the thrust is small in the initial stage of operation because the distance between the flat surfaces 300a and 300b is large, and increases as the flat surfaces 300a and 300b approach each other.

In Comparative Example 3 (D), the thrust is at a maximum in the initial stage of operation (when the gap is at a maximum), and decreases as the gap decreases. In other words, since the projection 400a and the recess 400b are close to each other in the initial stage of operation, the thrust in the initial stage of operation is larger than those in Comparative Examples 1 and 2. However, since the projection 400a and the recess 400b do not have acute portions, the thrust in the initial stage of operation is relatively small.

According to the present embodiment (A), since the plunger 11 and the core 12 of the solenoid 10A are shaped as described above, the thrust in the initial stage of operation (when the gap is at a maximum) is larger than those in Comparative Examples 1 to 3. The thrust decreases as the gap decreases. The end portion 11a1 of the plunger projection 11a and the end portion 12c1 of the core projection 12c have an acute shape, and the end portions 11a1 and 12c1 are closest to each other in the initial stage of operation (see FIGS. 1 to 4). Since the magnetic flux concentrates at the end portions 11a1 and 12c1, the thrust in the initial stage of operation is larger than those in Comparative Examples 1 to 3. As the gap decreases, the concentration of the magnetic flux between the plunger 11 and the core 12 decreases. Therefore, the thrust decreases accordingly.

As described above, in the solenoid 10A according to the first embodiment, the core 12 includes a core projection 12c that is opposed to the plunger 11, and the plunger 11 includes a plunger projection 11a that is opposed to the core 12. In addition, the core 12 includes the plunger receiving portion 12d that receives the plunger projection 11a when the electromagnetic coil 13 is energized, and the plunger 11 includes the core receiving portion 11b that receives the core projection 12c when the electromagnetic coil 13 is energized. In the solenoid 10A, the end portion 12c1 of the core projection 12c and the end portion 11a1 of the plunger projection 11a have an acute shape in the axial cross section. Of all parts of the core 12 and the plunger 11, the end portion 12c1 of the core projection 12c and the end portion 11a1 of the plunger projection 11a are the parts that are closest to each other when the electromagnetic coil 13 is not energized. Accordingly, the magnetic flux can be concentrated at a thrust-generating portion (gap portion) between the end portions 11a1 and 12c1. As a result, even when the stroke is large (long), the thrust in the initial stage of operation can be increased without causing the electromagnetic coil 13 to generate a large electromagnetic force (see FIG. 5). In addition, in the case where the pressure difference across the valve disc 3 (P1-P2, see FIG. 3) is large, sufficient thrust can be generated against the load applied to the area that receives the pressure difference.

In the first embodiment, only the shapes of the plunger 11 and the core 12 are changed such that the plunger 11 includes the plunger projection 11a and the core receiving portion 11b and the core 12 includes the core projection 12c and the plunger receiving portion 12d. Accordingly, even when the stroke is large, the thrust in the initial stage of operation (state before the operation) can be increased without adding another component to the basic structure (the plunger, the core, the electromagnetic coil, and the casing) of the solenoid 10A, in other words, without increasing the number of components. In addition, since it is not necessary to increase the electric power applied to the electromagnetic coil 13, it is not necessary to use a larger electromagnetic coil or an expensive material with good magnetic characteristics.

In the solenoid valve 1 including the solenoid 10A according to the first embodiment, the thrust in the initial stage of operation can be increased as described above. In addition, since the thrust decreases as the plunger 11 moves, or as the gap decreases (see the graph (A) in FIG. 5E), the collision energy applied to the stopper 5 (see FIG. 3), which limits the stroke (displacement) of the plunger 11, can be reduced. As a result, the collision noise of the stopper 5 can be reduced and the durability of the stopper 5 can be increased.

Second Embodiment

Figure 6:
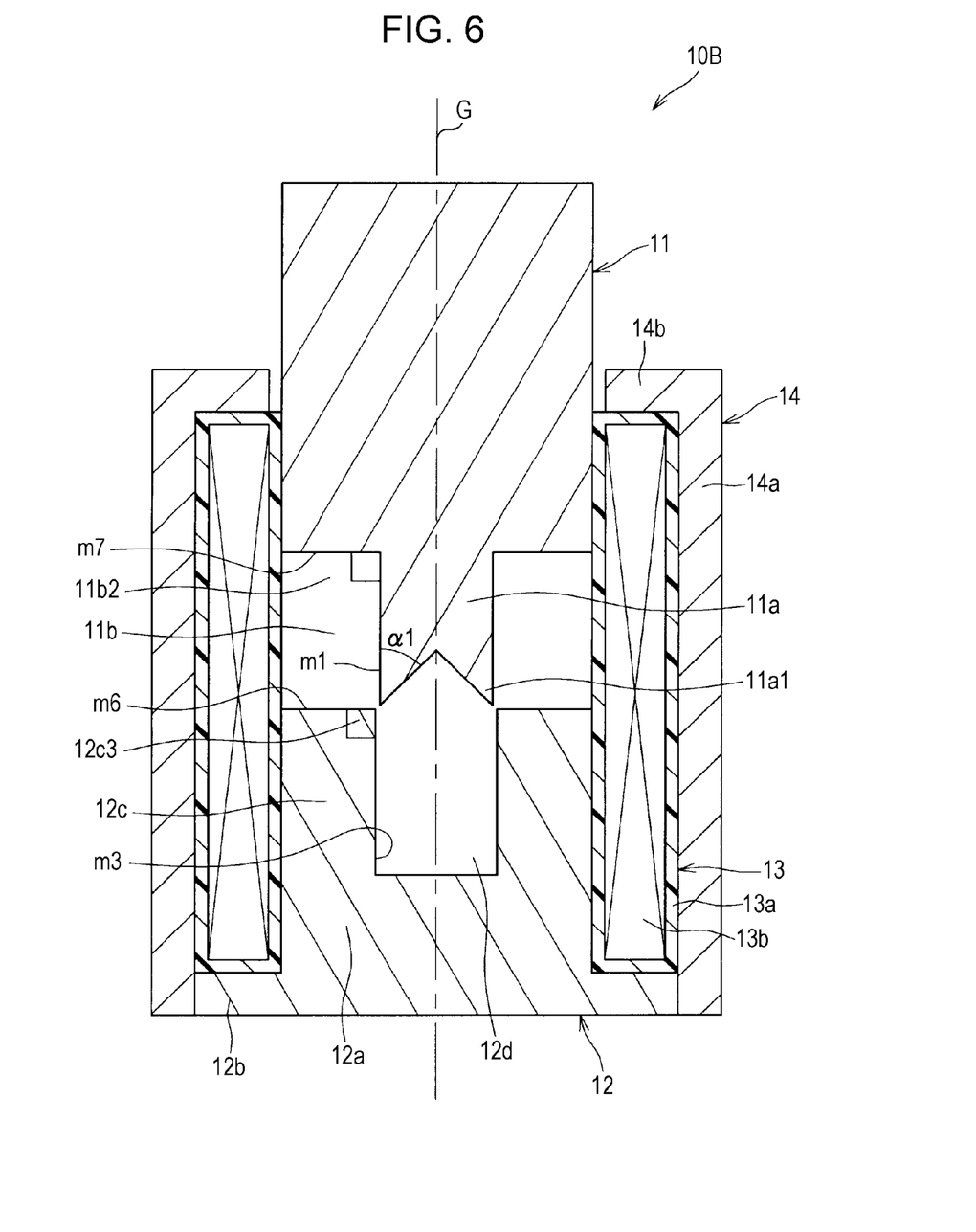
FIG. 6 is a sectional view of a solenoid according to a second embodiment.

FIG. 6 is a sectional view of a solenoid 10B according to a second embodiment. The solenoid 10B includes a core projection 12c and a plunger projection 11a, and the plunger projection 11a includes an end portion 11a1 having an acute angle in the axial cross section. Components similar to those in the first embodiment are denoted by the same reference numerals, and explanations thereof are thus omitted (this also applies to the following embodiments).

In the solenoid 10B, the core projection 12c includes an end portion 12c3 having a surface m6 that extends in a direction orthogonal to the axial direction G in the axial cross section. More specifically, the end portion 12c3 is formed such that a surface m3 that linearly extends along the axial direction G and the surface m6 form an angle of 90° therebetween. A core receiving portion 11b has a surface m7 that is parallel to the surface m6 of the end portion 12c3. Similar to the end portion 12c3, the core receiving portion 11b has an angle of 90°. The angle of the end portion 12c3 that faces the end portion 11a1 is not limited to 90°, and may instead be an obtuse angle. More specifically, the angle of the surface m6 with respect to the surface m3, which is parallel to the axial direction G, may be an obtuse angle. In such a case, the angle of the surface m7 is also set to an obtuse angle.

In the initial stage of operation (before the operation), the end portion 12c3 of the core projection 12c and the end portion 11a1 of the plunger projection 11a are the parts that are closest to each other. According to the present embodiment, in the non-energized state (in the initial stage of operation or before the operation), corners of the end portions 11a1 and 12c3 are substantially opposed to each other in the direction orthogonal to the axial direction G.

According to the second embodiment, only the end portion 11a1 of the plunger projection 11a has an acute shape. Even in this case, when the electromagnetic coil 13 is not energized, the magnetic flux can be concentrated at a thrust-generating portion (gap portion) between the end portions 11a1 and 12c1. As a result, even when the stroke is large (long), the thrust in the initial stage of operation can be increased.

Therefore, it is not necessary to increase the electric power applied to the electromagnetic coil 13, and it is not necessary to use a larger electromagnetic coil or an expensive material with good magnetic characteristics. In addition, since the thrust decreases as the plunger 11 moves, or as the gap decreases, the collision energy applied to the stopper 5 (see FIG. 3; not illustrated in FIG. 6), which limits the stroke (displacement) of the plunger 11, can be reduced. As a result, the collision noise of the stopper 5 can be reduced and the durability of the stopper 5 can be increased.

Third Embodiment

Figure 7:
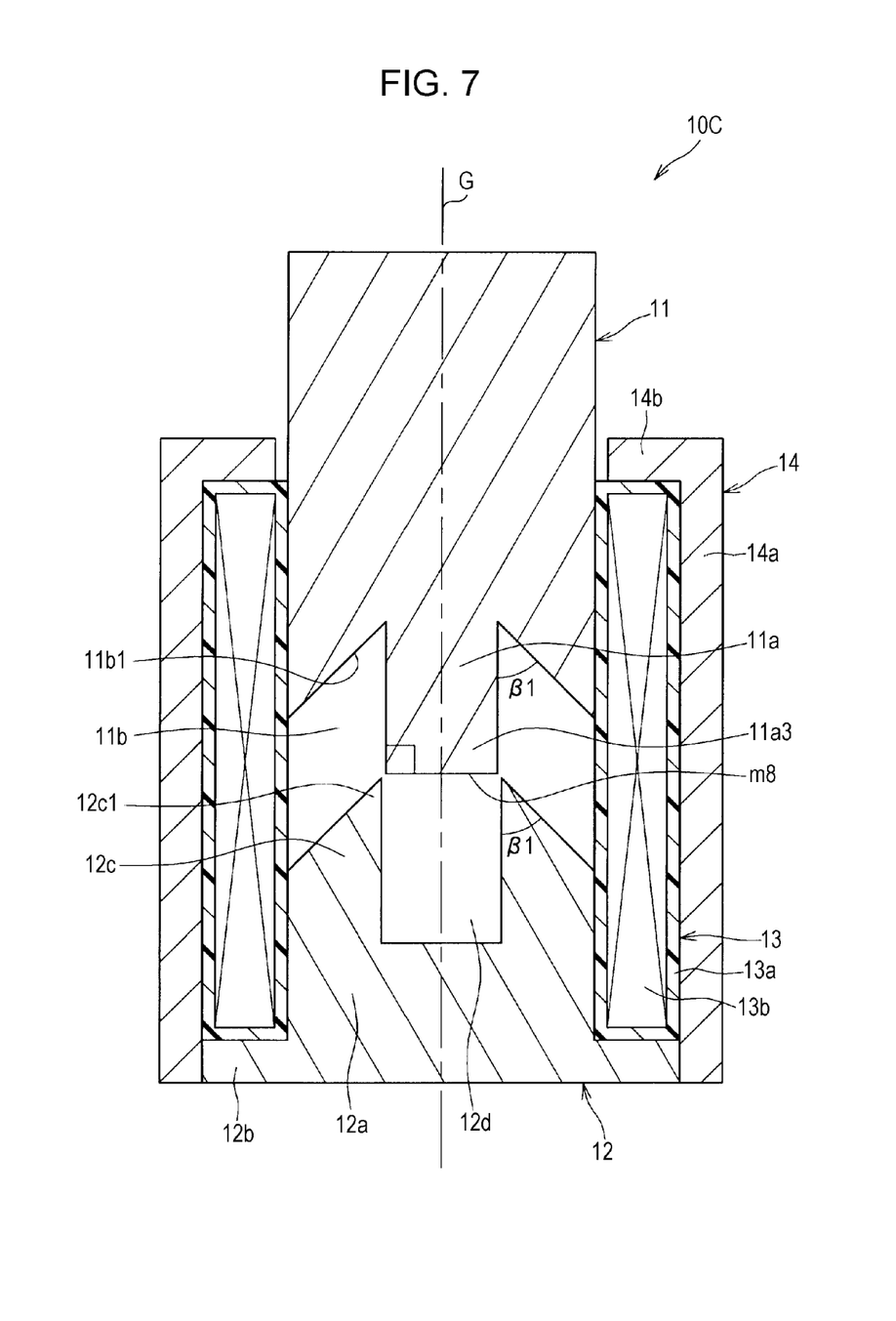
FIG. 7 is a sectional view of a solenoid according to a third embodiment.

FIG. 7 is a sectional view of a solenoid 10C according to a third embodiment. The solenoid 10C includes a core projection 12c and a plunger projection 11a, and an end portion 12c1 of the core projection 12c and a core receiving portion 11b of the plunger projection 11a have an acute angle in the axial cross section.

The solenoid 10C is similar to the solenoid of the first embodiment except that an end portion 11a3 of the plunger projection 11a has a surface m8 that is orthogonal to the axial direction G. The effects of the third embodiment are similar to those of the second embodiment.

Fourth Embodiment

Figure 8:
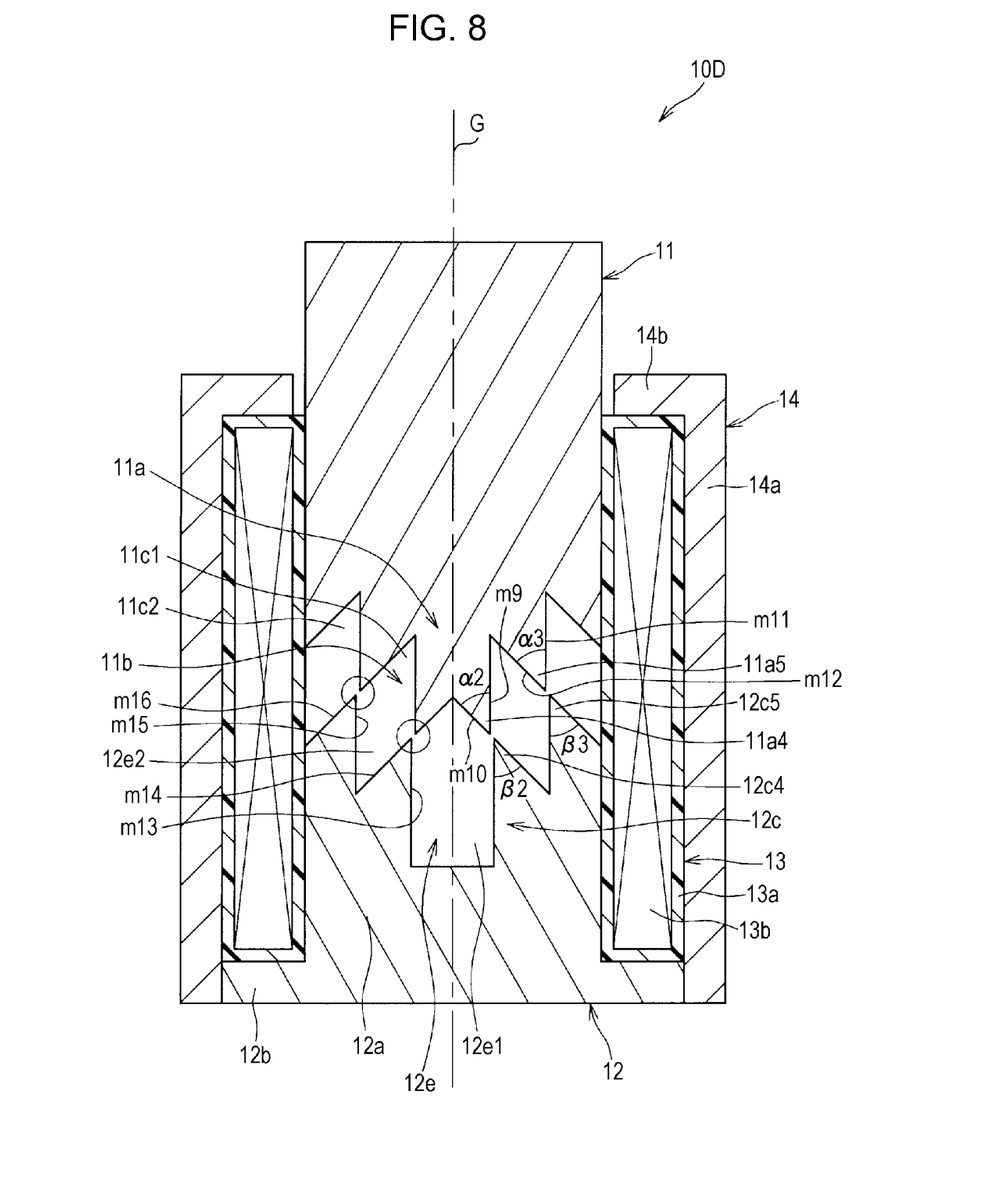
FIG. 8 is a sectional view of a solenoid according to a fourth embodiment.

FIG. 8 is a sectional view of a solenoid 10D according to a fourth embodiment. The solenoid 10D includes a plunger projection 11a including a plurality of end portions 11a4 and 11a5 and a core projection 12c including a plurality of end portions 12c4 and 12c5 that correspond to the end portions 11a4 and 11a5, respectively.

In the solenoid 10D, the plunger projection 11a includes the end portions 11a4 and 11a5, which have an annular shape, and the core projection 12c includes the end portions 12c4 and 12c5, which also have an annular shape. The plunger 11 also includes a core receiving portion 11b that receives the core projection 12c when the electromagnetic coil 13 is energized. The core 12 also includes a plunger receiving portion 12e that receives the plunger projection 11a when the electromagnetic coil 13 is energized.

The end portion 11a4 is positioned close to the center in the radial direction, and the end portion 11a5 is positioned outside the end portion 11a4 in the radial direction. The end portion 11a4 projects further toward the core 12 than the end portion 11a5 in the axial direction G.

The end portion 11a4 is formed such that a surface m9 that extends linearly along the axial direction G and a surface m10 that is inclined radially inward with respect to the axial direction G form an acute angle $\alpha 2$ therebetween. The end portion 11a5 is formed such that a surface m11 that extends linearly along the axial direction G and a surface m12 that is inclined radially inward with respect to the axial direction G form an acute angle $\alpha 3$ therebetween.

The end portion 12c4 is positioned close to the center in the radial direction, and the end portion 12c5 is positioned outside the end portion 12c4 in the radial direction. The end portion 12c5 projects further toward the plunger 11 than the end portion 12c4 in the axial direction G.

The end portion 12c4 is formed such that a surface m13 that extends linearly along the axial direction G and a surface m14 that is inclined radially outward with respect to the axial direction G form an acute angle $\beta 2$ therebetween. The end portion 12c5 is formed such that a surface m15 that extends linearly along the axial direction G and a surface m16 that is inclined radially outward with respect to the axial direction G form an acute angle $\beta 3$ therebetween.

The angles $\alpha 2$, $\alpha 3$, $\beta 2$, and $\beta 3$ may be equal to each other. Alternatively, the angles $\alpha 2$ and $\beta 2$ may differ from each other, and the angles $\alpha 3$ and $\beta 3$ may differ from each other. The angles $\beta 2$ and $\alpha 3$ are preferably equal to each other.

The core receiving portion 11b includes a first receiving portion 11c1 that receives a part of the core projection 12c having the end portion 12c4 and a second receiving portion 11c2 that receives a part of the core projection 12c having the end portion 12c5.

The plunger receiving portion 12e includes a first receiving portion 12e1 that receives a part of the plunger projection 11a having the end portion 11a4 and a second receiving portion 12e2 that receives a part of the plunger projection 11a having the end portion 11a5.

The end portion 11a4 of the plunger projection 11a can be removably inserted into the first receiving portion 12e1 of the plunger receiving portion 12e without coming into contact therewith, and the end portion 11a5 of the plunger projection 11a can be removably inserted into the second receiving portion 12e2 of the plunger receiving portion 12e without coming into contact therewith.

In the solenoid 10D having the above-described structure, when the electromagnetic coil 13 is not energized, the end portions 11a4 and 11a5 and the end portions 12c4 and 12c5 are the parts that are closest to each other. In the present embodiment, when the electromagnetic coil 13 is not energized, corners of the end portions 11a4 and 12c4 are substantially opposed to each other in the direction orthogonal to the axial direction G, and corners of the end portions 11a5 and 12c5 are substantially opposed to each other in the direction orthogonal to the axial direction G.

According to the fourth embodiment, as illustrated in the circled areas in FIG. 8, the number of thrust-generating portions (gap portions) is increased to two. Therefore, the magnetic flux concentrates at two locations. As a result, even when the stroke is large (long), the thrust in the initial stage of operation can be further increased. Other effect of the present embodiment are similar to those of the first embodiment.

Although two pairs of acute parts that are close to each other are provided in the present embodiment, three or more pairs may be provided instead. When three or more pairs of acute parts that are close to each other are provided, the number of locations at which the magnetic flux concentrates can be increased. Accordingly, the number of locations at which sufficient thrust can be ensured in the initial stage of operation can be increased. As a result, the electric power for energizing the electromagnetic coil and the size of the electromagnetic coil can be more reliably prevented from being increased.

In addition, according to the fourth embodiment, all of the end portions 11a4 and 11a5 of the plunger projection 11a and the end portions 12c4 and 12c5 of the core projection 12c have an acute angle in the axial cross section. However, the structure may be such that only the end portions 11a4 and 11a5 of the plunger projection 11a have an acute angle, as in the second embodiment (see FIG. 6). Alternatively, the structure may be such that only the end portions 12c4 and 12c5 of the core projection 12c have an acute angle, as in the third embodiment (see FIG. 7).

Modification of First Embodiment

Figure 9:
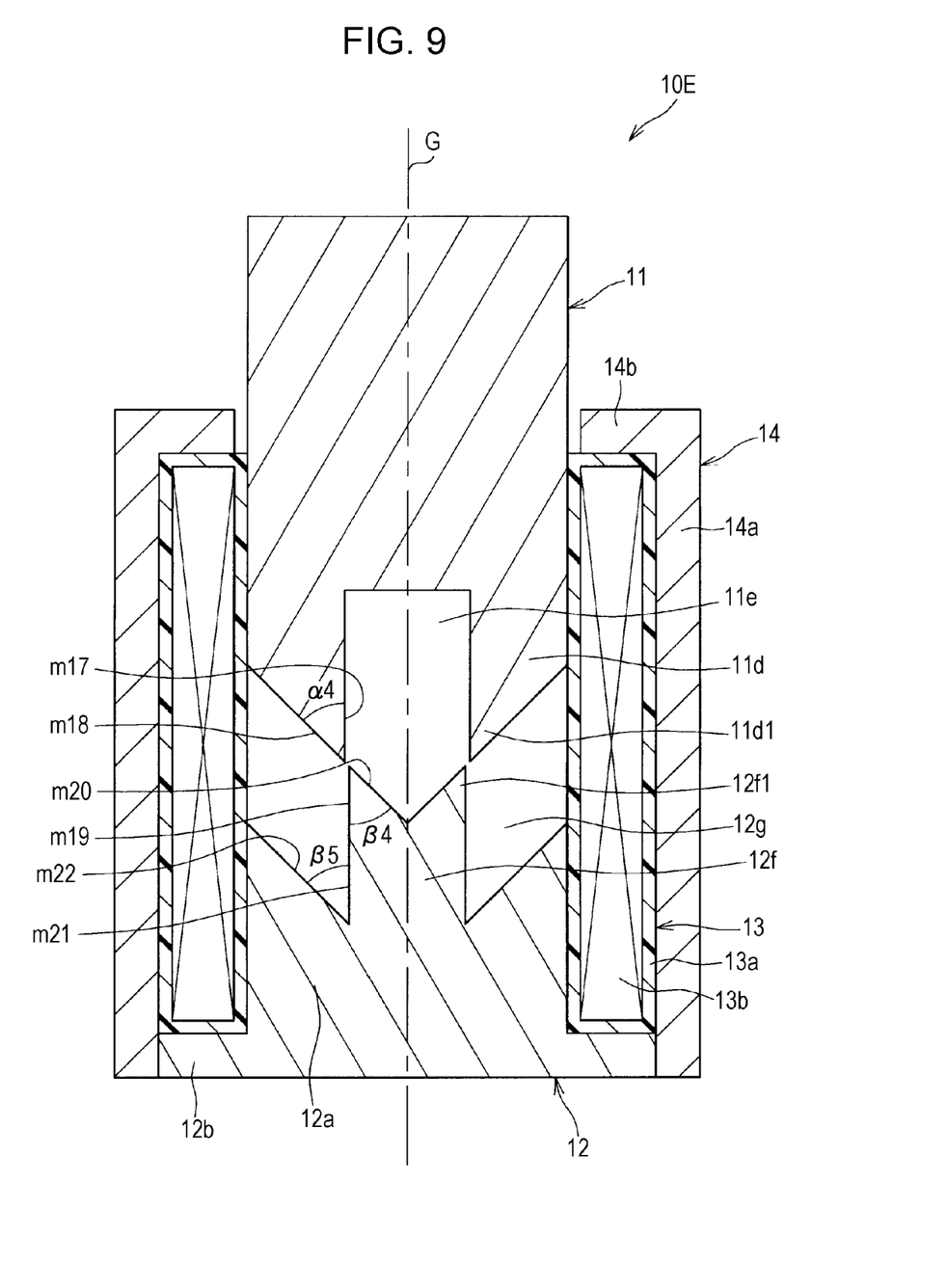
FIG. 9 is a sectional view of a solenoid according to a modification of the first embodiment.

FIG. 9 is a sectional view of a solenoid 10E according to a modification of the first embodiment. The solenoid 10E includes a plunger projection 11d and a core projection 12f, and the plunger projection 11d is positioned outside the core projection 12f in the radial direction. Effects of this modification are similar to those of the first embodiment, and explanations thereof are thus omitted. In the following description, only the structure different from that of the first embodiment will be explained. In this case, a stopper 5 (see FIG. 3; not illustrated in FIG. 9) is disposed in a core receiving portion 11e.

In the solenoid 10E, the plunger projection 11d has a substantially cylindrical shape and projects toward the core 12. The outer diameter of the plunger projection 11d is equal to the diameter of the plunger 11. The plunger projection 11d includes an end portion 11d1 having an acute angle in the axial cross section. More specifically, the end portion 11d1 of the plunger projection 11d is formed such that a surface m17 that linearly extends along the axial direction G and a surface m18 that is inclined radially outward with respect to the axial direction G form an acute angle $\alpha 4$ therebetween.

The core projection 12f has a substantially columnar shape and can be removably inserted into the space surrounded by the plunger projection 11d without coming into contact therewith. The core projection 12f includes an end portion 12f1 having an acute angle in the axial cross section. More specifically, the end portion 12f1 of the core projection 12f is formed such that a surface m19 that linearly extends along the axial direction G and a surface m20 that is inclined radially inward with respect to the axial direction G form an acute angle $\beta 4$ therebetween. The angles $\alpha 4$ and $\beta 4$ are not particularly limited as long as they are acute. The angles $\alpha 4$ and $\beta 4$ may either be the same or different from each other.

The plunger 11 also includes the core receiving portion 11e that is provided inside the plunger projection 11d. The core receiving portion 11e has a recessed shape and receives the core projection 12f when the electromagnetic coil 13 is energized.

The core 12 also has a plunger receiving portion 12g that receives the end portion 11d1 of the plunger projection 11d.

The plunger receiving portion 12g is formed such that a surface m21 that extends linearly along the axial direction G and a surface m22 that is inclined radially outward with respect to the axial direction G form an acute angle β5 therebetween. The angles α4 and β5 are preferably equal to each other.

In the solenoid 10E having the above-described structure, when the electromagnetic coil 13 is not energized, the end portions 11d1 and 12f1 are the parts that are closest to each other. In the present embodiment, corners of the end portions 11d1 and 12f1 are substantially opposed to each other in the direction orthogonal to the axial direction G.

Modification of Fourth Embodiment

Figure 10:
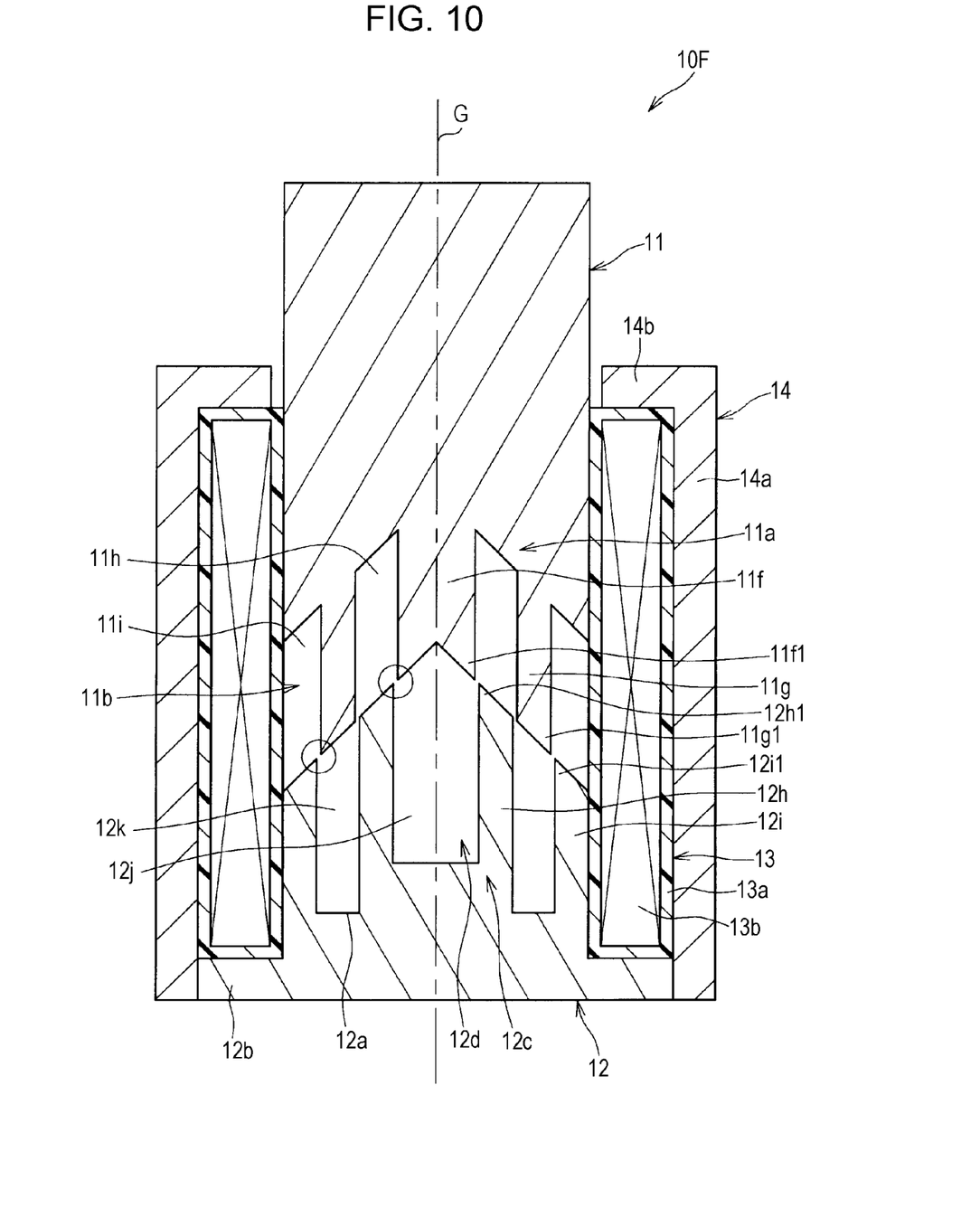
FIG. 10 is a sectional view of a solenoid according to a modification of the fourth embodiment.

FIG. 10 is a sectional view of a solenoid 10F according to a modification of the fourth embodiment. The solenoid 10F has a shape including projections and recesses instead of the sawtooth shape (see FIG. 8) as in the fourth embodiment.

The solenoid 10F includes a plunger projection 11a including a substantially columnar first projection 11f and a substantially cylindrical second projection 11g and a core projection 12c including a substantially cylindrical first projection 12h and a substantially cylindrical second projection 12i.

The first projection 11f of the plunger projection 11a includes an end portion 11f1 having an acute angle in the axial cross section. The second projection 11g includes an end portion high having an acute angle in the axial cross section. Thus, the plunger projection 11a includes a plurality of end portions 11f1 and high.

The first projection 12h of the core projection 12c includes an end portion 12h1 having an acute angle in the axial cross section. The second projection 12i includes an end portion 12i1 having an acute angle in the axial cross section. Thus, the core projection 12c includes a plurality of end portions 12h1 and 12i1 that correspond to the end portions 11f1 and 11g1 of the plunger projection 11a.

The plunger 11 also includes a core receiving portion 11b including a first receiving portion 11h that receives the first projection 12h and a second receiving portion 11i that receives the second projection 12i. The core 12 also includes a plunger receiving portion 12d including a first receiving portion 12j that receives the first projection 11f and a second receiving portion 12k that receives the second projection 11g.

In the solenoid 10F having the above-described structure, as illustrated in the circled areas in FIG. 10, the end portions 11f1 and 12h1 of the first projections 11f and 12h and the end portions 11g1 and 12i1 of the second projections 11g and 12i are the parts that are closest to each other in the initial stage of operation (when the electromagnetic coil 13 is not energized).

Thus, the number of thrust-generating portions (gap portions) is increased to two, and the magnetic flux concentrates at two locations. Accordingly, the number of locations at which sufficient thrust can be generated in the initial stage of operation even when the stroke is large (long) is increased. As a result, the electric power for energizing the electromagnetic coil and the size of the electromagnetic coil can be more reliably prevented from being increased. Other effects are similar to those of the first embodiment.

In the above-described embodiments, the corners of the end portions 11a1, 11a4, 11a5, and 11d1 and the corners of the end portions 12c1, 12c4, 12c5, and 12f1 are substantially opposed to each other in the direction orthogonal to the axial direction G. However, the end portions are not limited to this, and may instead be arranged such that the end portions that are opposed to each other are separated from each other in the axial direction G within a range such that sufficient thrust can be generated in the initial stage of operation.

According to an aspect of the embodiments, solenoid includes a plunger that is movable in an axial direction, a core that is opposed to the plunger in the axial direction, an electromagnetic coil that pulls the plunger toward the core when energized, and a casing that houses the plunger, the core, and the electromagnetic coil. The plunger includes a plunger projection that is opposed to the core, and the core includes a core projection that is opposed to the plunger. The plunger includes a core receiving portion that receives the core projection when the electromagnetic coil is energized, and the core includes a plunger receiving portion that receives the plunger projection when the electromagnetic coil is energized. At least one of an end portion of the plunger projection and an end portion the core projection has an acute angle in cross section along the axial direction. Of all parts of the core and the plunger, the end portion of the plunger projection and the end portion of the core projection are the parts that are closest to each other when the electromagnetic coil is not energized.

Thus, at least one of the end portion of the core projection and the end portion of the plunger projection has an acute angle in cross section along the axial direction, and the end portion of the core projection and the end portion of the plunger projection are closest to each other when the electromagnetic coil is not energized. Accordingly, the magnetic flux effectively concentrates at a thrust-generating portion (gap portion). As a result, even when the stroke is large, the thrust generated by the solenoid in the initial stage of operation (state before the operation) can be increased.

In addition, only the shapes of the plunger and the core are changed such that the plunger includes the plunger projection and the core receiving portion and the core includes the core projection and the plunger receiving portion. Accordingly, even when the stroke is large, the thrust in the initial stage of operation (state before the operation) can be increased without adding another component to the basic structure of the solenoid, in other words, without increasing the number of components. Since it is not necessary to increase the magnetomotive force of the electromagnetic coil to generate sufficient thrust in the initial stage of operation, the electric power for energizing the electromagnetic coil and the size of the electromagnetic coil can be prevented from being increased. In addition, it is not necessary to use an expensive material with good magnetic characteristics.

The plunger projection may include a plurality of the end portions, and the core projection may include a plurality of the end portions that correspond to the end portions of the plunger projection.

In this case, the magnetic flux concentrates at a plurality of locations between the end portions of the core projection and the end portions of the plunger projection in the initial stage of operation (state before the operation). Thus, the number of locations at which sufficient thrust can be ensured in the initial stage of operation (state before the operation) of the solenoid can be increased. As a result, the electric power for energizing the electromagnetic coil and the size of the electromagnetic coil can be more reliably prevented from being increased.

According to another aspect of the present application, a solenoid valve includes the above-described solenoid, a valve box, a valve disc, and an urging member. A flow channel is formed in the valve box, and allows pressure fluid to flow therethrough. The valve disc is capable of coming into contact with and moving away from a valve seat in conjunction with a movement of the plunger in the solenoid. The valve seat is provided on the valve box. The urging member urges the valve disc in a valve opening direction.

In this case, the thrust applied to the valve disc by the solenoid in the initial stage of operation can be increased. The thrust decreases as the plunger moves, so that the collision energy applied to a stopper, which is provided to limit the movement (displacement) of the plunger, can be reduced. As a result, the collision noise of the stopper can be reduced and the durability of the stopper can be increased.

According to the embodiments, a solenoid that has a simple structure and that generates a large thrust in the initial stage of operation and a solenoid valve including the solenoid can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A solenoid comprising:
    a plunger having a central axis in an axial direction and movable in the axial direction, the plunger being provided with a plunger projection and a core receiving portion, the plunger projection extending coaxially with the central axis and having a diameter smaller than a diameter of the plunger;
    a core provided to face the plunger in the axial direction and including a core projection and a plunger receiving portion having a center hole at a center of the core, the center hole having a bottom to face the end portion of the plunger projection;
    an electromagnetic coil configured to pull the plunger toward the core while the electromagnetic coil is energized, the core receiving portion of the plunger being to receive the core projection while the electromagnetic coil is energized, the plunger receiving portion of the core being to receive the plunger projection while the electromagnetic coil is energized;
    a casing housing the plunger, the core, and the electromagnetic coil;
    at least one of an end portion of the plunger projection and an end portion of the core projection having an acute angle in a cross section along the axial direction; and
    a distance between the end portion of the plunger projection and the end portion of the core projection being shortest among distances between the core and the plunger while the electromagnetic coil is not energized.

2. The solenoid according to claim 1, wherein the plunger projection includes a plurality of end portions, and the core projection includes a plurality of end portions that correspond to the plurality of end portions of the plunger projection, respectively.

3. The solenoid according to claim 1,
    wherein the plunger receiving portion includes a core hole extending in the axial direction, and
    wherein the plunger projection is provided in the core hole while the electromagnetic coil is energized.

4. The solenoid according to claim 3,
    wherein the core receiving portion includes a recess provided on a radially outer side of the plunger projection,
    wherein the core projection is provided in the recess while the electromagnetic coil is energized.

5. The solenoid according to claim 3,
    wherein the core hole includes an inner peripheral surface extending along the axial direction,
    wherein the core projection includes a core inclined surface inclined radially outward with respect to the axial direction, and
    wherein the acute angle is provided between the inner peripheral surface and the core inclined surface in the cross section.

6. The solenoid according to claim 5,
    wherein the plunger projection includes an outer peripheral surface and a first inclined surface,
    wherein the outer peripheral surface extends along the axial direction, and faces the inner peripheral surface while the electromagnetic coil is energized,
    wherein the first inclined surface is inclined radially inward with respect to the axial direction, and
    wherein the acute angle is provided between the outer peripheral surface and the first inclined surface in the cross section.

7. The solenoid according to claim 6,
    wherein the plunger projection includes a second inclined surface inclined radially outward with respect to the axial direction and provided on a radially outer side of the plunger projection, and
    wherein the core inclined surface faces the second inclined surface while the electromagnetic coil is energized.

8. The solenoid according to claim 7,
    wherein an acute angle is provided between the outer peripheral surface and the second inclined surface in the cross section.

9. The solenoid according to claim 1,
    wherein the plunger projection includes an outer peripheral surface and a plunger inclined surface,
    wherein the outer peripheral surface extends along the axial direction,
    wherein the plunger inclined surface is inclined radially inward with respect to the axial direction, and
    wherein the acute angle is provided between the outer peripheral surface and the plunger inclined surface in the cross section.

10. The solenoid according to claim 1,
    wherein the core receiving portion includes a plunger hole extending in the axial direction,
    wherein the plunger receiving portion includes a recess provided on a radially outer side of the core projection,
    wherein the core projection is provided in the plunger hole while the electromagnetic coil is energized, and
    wherein the plunger projection is provided in the recess while the electromagnetic coil is energized.

11. A solenoid valve comprising:
    the solenoid according to claim 1;
    a valve box including a flow channel through which pressure fluid flows;
    a valve seat provided on the valve box;
    a valve disc contactable with and movable away from the valve seat in conjunction with a movement of the plunger in the solenoid; and
    an urging member to urge the valve disc in a valve opening direction.

* * * * *